US007600152B2

United States Patent
Ash et al.

(10) Patent No.: US 7,600,152 B2
(45) Date of Patent: *Oct. 6, 2009

(54) CONFIGURING CACHE MEMORY FROM A STORAGE CONTROLLER

(75) Inventors: Kevin J. Ash, Tucson, AZ (US); David F. Mannenbach, Tucson, AZ (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 11/926,537

(22) Filed: Oct. 29, 2007

(65) Prior Publication Data

US 2008/0091973 A1    Apr. 17, 2008

Related U.S. Application Data

(63) Continuation of application No. 10/814,061, filed on Mar. 31, 2004, now Pat. No. 7,321,986.

(51) Int. Cl.
    *G06F 11/00*    (2006.01)
(52) U.S. Cl. ............................ 714/10; 714/54; 711/144
(58) Field of Classification Search ................... None
    See application file for complete search history.

(56) References Cited

U.S. PATENT DOCUMENTS

| 5,649,090 | A  | 7/1997  | Edwards et al. |
| 5,761,413 | A  | 6/1998  | Frank et al. |
| 5,944,780 | A  | 8/1999  | Chase et al. |
| 6,061,750 | A  | 5/2000  | Beardsley et al. |
| 6,513,097 | B1 | 1/2003  | Beardsley et al. |
| 6,516,429 | B1 | 2/2003  | Bossen et al. |
| 6,532,519 | B2 | 3/2003  | Arimilli et al. |
| 2004/0205297 | A1 | 10/2004 | Bearden |

*Primary Examiner*—Marc Duncan
(74) *Attorney, Agent, or Firm*—Scully, Scott, Murphy & Presser, P.C.; Kurt Goudy, Esq.

(57) ABSTRACT

Disclosed are a storage controller, and a method of operating a storage controller, for interfacing between host systems and a storage devices system. The storage controller includes a first cluster including a first processor and a first cache, and a second cluster including a second processor and a second cache. The method comprises the step of directing data from the host systems through first and second data paths to the storage system. The first processor and cache are associated with the first data path, and the second processor and cache are associated with the second data path. Under one set of conditions, the controller enters a failover mode, wherein data directed to the first data path are routed to the second data path. Under another set of conditions, the controller deconfigures the first cache without entering the failover mode.

10 Claims, 3 Drawing Sheets

# CONFIGURING CACHE MEMORY FROM A STORAGE CONTROLLER

This application is a continuation application of U.S. Ser. No. 10/814,061, filed Mar. 31, 2004.

BACKGROUND OF THE INVENTION

1. Field of the Invention

This invention generally relates to a storage controller that interfaces between host computer systems and a direct access storage device system. More specifically, the invention relates to deconfiguring cache memory from such a storage controller.

2. Background Art

In a large distributed computer system, a plurality of host computers and devices are typically connected to a number of direct access storage devices (DASDs) comprised of hard disk drives (HDDs). The DASDs may be organized in a redundant array of independent disks, i.e., a RAID array. A RAID array is comprised of multiple, independent disks organized into a large, high-performance logical disk. A controller stripes data across the multiple disks in the array and accesses the disks in parallel to achieve higher data transfer rates. However, utilizing multiple disks in an array increases the risk of failure. The solution in the art is to employ redundancy in the form of error-correcting codes to tolerate disk failures.

Not only is there is a risk associated with the failure of a hard disk drive in a DASD system such as a RAID array, but there is also a risk of failure at a point within a storage controller which controls read and write operations between host computers and the DASDs. The conventional storage controller is typically designed to handle hardware failure. One such storage control designed to handle certain hardware failures is the storage controller utilized in the International Business Machines Corporation's (IBM) Enterprise Storage Server (ESS) system. This storage controller has two storage clusters, each of which provides for selective connection between a host computer and a DASD. Each cluster has a cache and a non volatile storage unit (NVS). The cache buffers frequently used data. When a request is made to write data to a DASD attached to the storage controller, the storage controller may cache the data and delay writing the data to a DASD. Caching data can save time as writing operations involve time consuming mechanical operations. The cache and NVS in each cluster can intercommunicate, allowing for recovery and reconfiguration of the storage controller in the event that one of the memory elements is rendered unavailable. For instance, if one cluster and its cache fails, the NVS in the other cluster maintains a back-up of the cache in the failed cluster.

These dual-cluster storage controllers may also failover to a single node configuration if a memory upgrade is required. During these periods of failover, the system is running on a single node configuration, which is less fault tolerant than the normal dual node configuration.

SUMMARY OF THE INVENTION

An object of this invention is to improve storage controllers for interfacing between host computer systems and a direct access storage device system.

Another object of the invention is to maintain dual cluster fault tolerance in a dual cluster storage controller even during a memory fail or a memory upgrade.

A further object of the present invention is to deconfigure a cache memory, of a dual cluster storage controller, without failing over to the other cluster, thus maintaining dual cluster fault tolerance.

These and other objectives are attained with a storage controller, and a method of operating a storage controller, for interfacing between a plurality of host systems and a direct access storage devices system. The storage controller includes a first cluster including a first processor and a first cache, and a second cluster including a second processor and a second cache. The method comprise the step of directing data from the host systems through first and second data paths in the storage controller to the direct access storage system, wherein the first processor and the first cache are associated with the first data path, and the second processor and the second cache are associated with the second data path. Under a first set of defined conditions, the controller enters into a failover mode, wherein data directed to the first data path are routed to the second data path. Under a second set of defined conditions, the controller deconfigures the first cache without entering the failover mode.

The first cache includes a series of memory pages; and in a preferred embodiment, the deconfiguring step includes the steps of identifying selected pages of the first cache; marking each of said selected pages as unavailable; and after all of said selected pages are marked as unavailable, removing the selected pages from the first cache.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
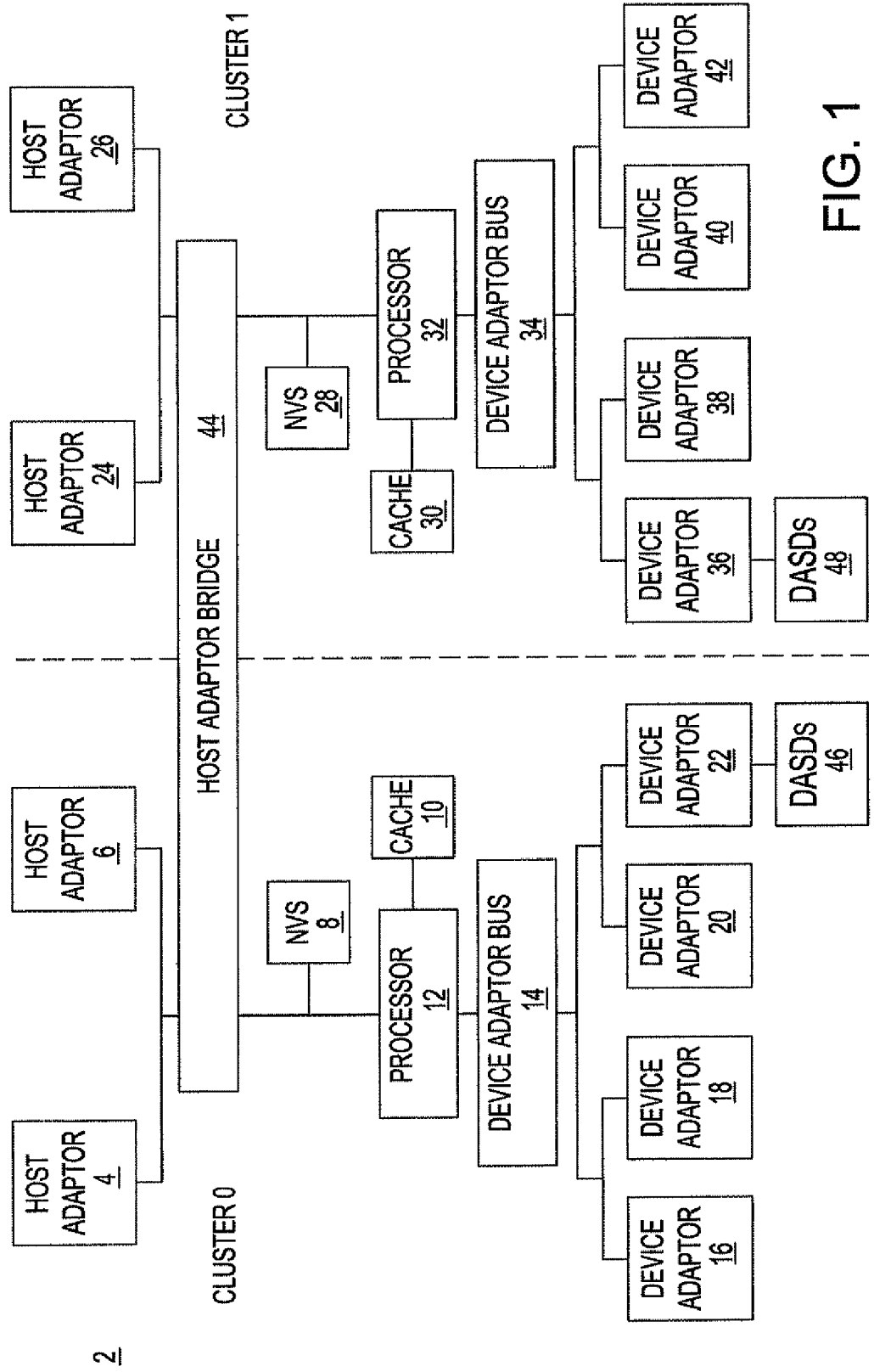
FIG. 1 illustrates a block diagram of a storage controller with which the present invention may be practiced.

In the following description, reference is made to the accompanying drawings which form a part thereof, and in which is shown, by way of illustration, a preferred embodiment of the present invention. It is understood that other embodiments may be utilized and structural changes may be made without departing from the scope of the present invention. Hardware Environment and Architecture of the Storage Controller FIG. 1 illustrates a block diagram of the components and architecture of the preferred embodiment of a storage controller 2 which interfaces between host computers or devices (not shown) and DASDs 46, 48, which include multiple RAID arrays. In preferred embodiments, the DASDs are magnetic storage units such as hard disk drives. The host computers and devices are connected to host adaptors 4, 6, 24, 26 via a bus interface (not shown), such as a SCSI bus interface. The host adaptors 4, 6, 24, 26 may be comprised of an Enterprise System Connection (ESCON) adaptor which provides access to ESCON channels and connections. Each host adaptor 4, 6, 24, 26 may be comprised of a series of host adaptors which connect to a host system.

In preferred embodiments, the storage controller 2 is divided into two clusters, cluster 0 and cluster 1. Cluster 0 is comprised of host adaptors 4, 6, a non-volatile storage unit (NVS) 8, a cache 10, a processor 12, a device adaptor bus 14, and device adaptors 16, 18, 20, 22. Cluster 1 is comprised of host adaptors 24, 26, an NVS 28, a cache 30, a processor 32, a device adaptor bus 34, and device adaptors 36, 38, 40, 42. A host adaptor bridge 44 interfaces the components of cluster 0 with cluster 1. The host adaptors 4, 6, 24, 26 are connected to the host adaptor bridge 44. In preferred embodiments, the bridge 44 is a dual master bus which may be controlled by one of the processors 12, 32 or one of the host adaptors 4, 6, 24, 26. In other embodiments, the host adaptor bridge 44 may include bridge technology to allow the bus to operate at its own clock speed and provide a buffer to buffer data transferred across the bridge 44. The bridge 44 interconnects the host adaptor 4, 6, 24, 26 with processors 12, 32. In preferred embodiments, the processors 12, 32 are symmetrical multi-processors, such as the IBM RS/6000 processor. Each processor 12, 32 maintains information on the configuration of the other cluster in order to re-route data transfers directed toward the other cluster.

The caches 10, 30 may be external to the processors 12, 32 or included in the processor 12, 32 complex. A processor 12, 32 in one cluster can communicate with the other processor, NVS 8, 28, and cache 10, 30 in the other cluster via the host adaptor bridge 44. In preferred embodiments, the NVS 8, 28 is comprised of a random access electronic storage with a battery backup. The cache 10, 30, in comparison, is a volatile storage unit that cannot maintain data in the event of a power failure.

Device adaptor bus 14 interconnects the processor 12 with the device adaptors 16, 18, 20 22, and device adaptor bus 34 interconnects processor 32 with device adaptors 36, 38, 40, 42. The device adaptors 16, 18, 20 22, 36, 38, 40 42 interface between the storage controller and DASDs, or RAID array of hard disk drives, In preferred embodiments, the DASDs may be interconnected in a loop topology including multiple RAID arrays.

Because one device adaptor from each cluster 0, 1 is attached to each loop of DASDs, failure in one cluster and/or the device adaptors associated with the failed cluster will not prevent the functioning cluster from accessing the loop. Thus, no single point of failure in a cluster and/or in a device adaptor will prevent the other cluster from accessing a group of DASDs. Moreover, if a device adaptor, such as device adaptor 22, fails in a cluster that is otherwise functioning properly, then the re-routing to the other device adaptor 36 can occur at the device adaptor level. Alternatively, the failure of a device adaptor can be treated as a failure by the entire cluster, thereby transferring control over to the functioning cluster to access the DASD.

As mentioned above, when the storage controller runs in a single node configuration, the system is less fault tolerant than when the system is in the dual node configuration. It is, therefore, highly desirable to reduce the number of circumstances in which the system runs in the single node configuration.

In accordance with the present invention, a procedure is provided to deconfigure cache memory without failing over to the other cluster, thus maintaining dual cluster fault tolerance. For purposes of example, this procedure will be explained with respect to cache 10. As will be understood by those of ordinary skill in the art, cache 30 may be constructed and operated in the same manner as cache 10.

Figure 2:
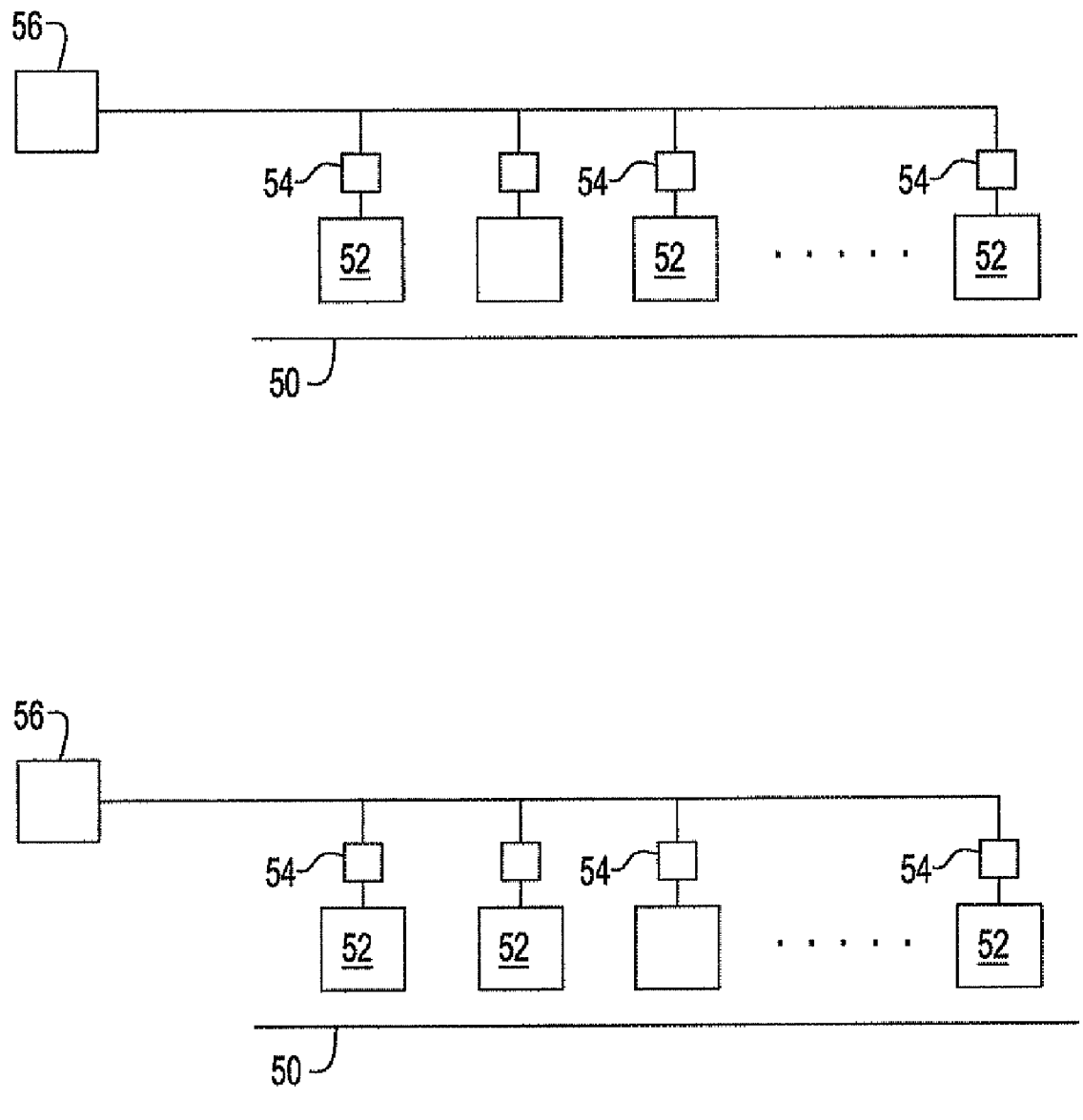
FIG. 2 schematically shows the control structure and memory configuration of one of the caches of the storage controller of FIG. 1.

With reference to FIG. 2, the data in cache 10 is structured in a logical track fashion. For example, in an ESS implementation, one logical track 50 contains seventeen discontiguous 4K pages 52. There is a control structure 54 (referred to as a segment control block) for each 4K page and another control structure 56 (referred to as the directory control block) for each track.

Removal Of Cache Memory From The Controller

Figure 3:
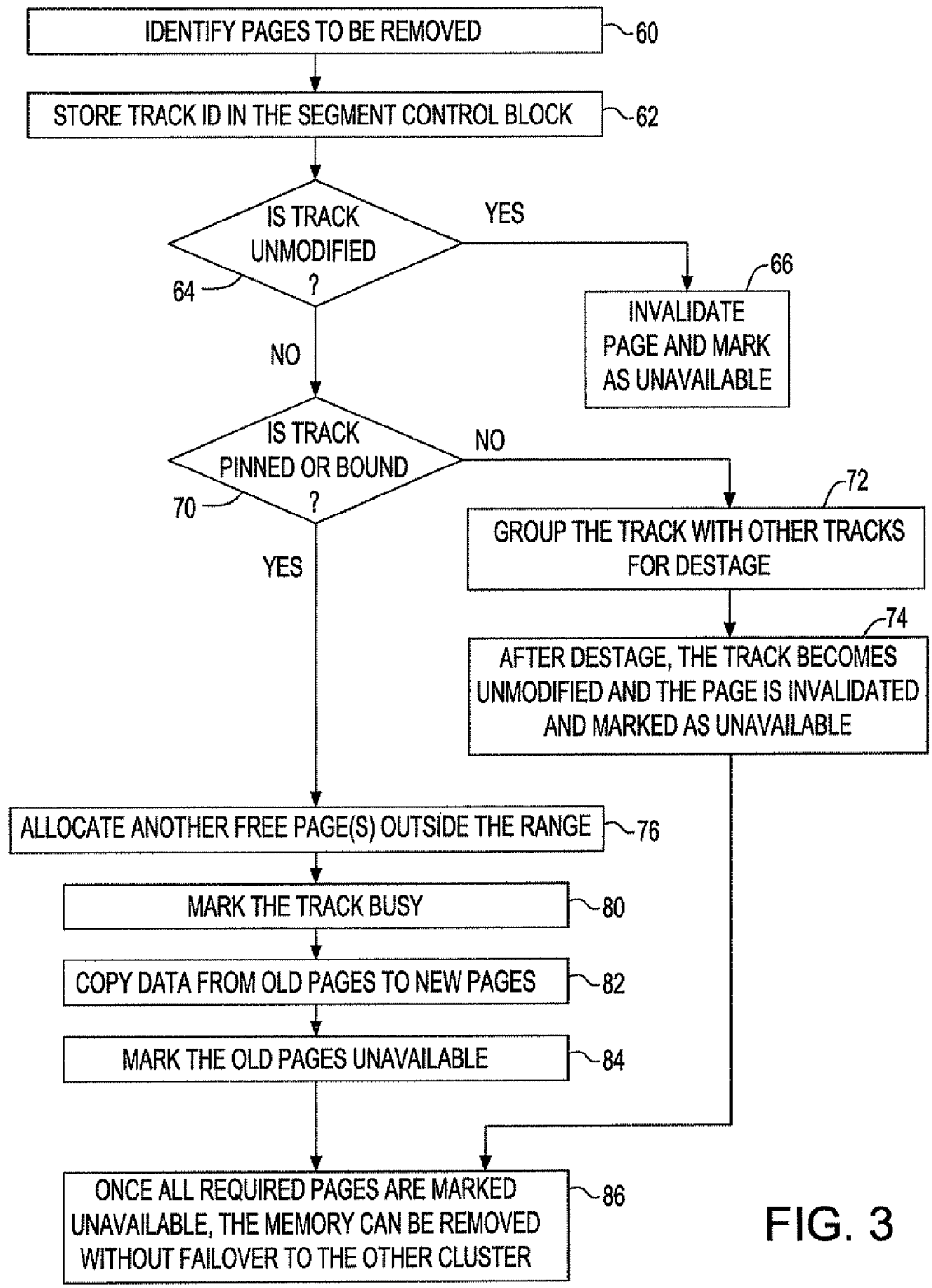
FIG. 3 is a flow chart illustrating a preferred procedure for deconfiguring the cache memory.

FIG. 3 shows a preferred procedure for removing cache memory from the controller. At step 60, the pages to be removed within a range are identified; and at step 62, a track id is stored in the segment control block 54 to identify which directory control block 56 pertains to the track containing the segment. At step 64, a determination is made as to whether the track is modified or unmodified. If the track is unmodified, then at step 66, the page is invalidated and marked unavailable. If the track is modified, then at step 70, a determination is made as to whether the track is pinned or bound.

If the track is modified but not pinned or bound, the track, at step 72, is grouped with other tracks for destage. Following a successful destage, the track, at step 74, becomes unmodified and the page is invalidated and marked unavailable. However, if the track is pinned or bound the memory management component proceed through steps 76, 80, 82 and 84. Specifically, at step 76, the management component allocates another free page or pages which are outside of the range; and at step 80, the track is marked busy. At step 82, the data is copied from the old pages to the new pages, and at step 84, the old pages are marked unavailable. Once all the required pages are marked unavailable, the memory, at step 86, can be removed without failover to the other cluster.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of operating a storage controller for interfacing between a plurality of host systems and a direct access storage devices system, the storage controller including a first cluster including a first processor and a first cache, and a second cluster including a second processor and a second cache, the method comprising:

directing data from the host systems through first and second data paths in the storage controller to the direct access storage system, wherein the first processor and the first cache are associated with the first data path, and the second processor and the second cache are associated with the second data path;

under a first set of defined conditions, entering into a failover mode, wherein data directed to the first data path are routed to the second data path; and under a second set of defined conditions, deconfiguring the first cache without entering the failover mode; and wherein the first cache includes a series of tracks, a series of memory pages on said tracks, and a multitude of segment control blocks, and wherein the deconfiguring includes identifying selected pages to be removed from the first cache, all of said selected pages being on the same one of said tracks, and storing in one of the segment control blocks an ID of said one of said tracks.

2. A method according to claim 1, wherein the deconfiguring step includes the further steps of:

marking each of said selected pages as unavailable; and after all of said selected pages are marked as unavailable, removing the selected pages from the first cache.

3. A method according to claim 2, wherein the step of marking each of the pages as unavailable includes the steps of, for each of the selected pages,
  determining whether the page is modified or unmodified;
  if the page is unmodified, marking the page as unavailable; and
  if the page is modified, processing the page according to a defined routine, and then marking the page as unavailable.

4. A storage controller for interfacing between a plurality of host systems and a direct access storage devices system, the storage controller comprising:
  a first cluster including a first processor and a first cache;
  a second cluster including a second processor and a second cache;
  means for directing data from the host systems through first and second data paths in the storage controller to the direct access storage system, wherein the first processor and the first cache are associated with the first data path, and the second processor and the second cache are associated with the second data path;
  means for entering, under a first set of defined conditions, into a failover mode, wherein data directed to the first data path are routed to the second data path; and
  means for deconfiguring the first cache, under a second set of defined conditions, without entering the failover mode; and
  wherein the first cache includes a series of tracks, a series of memory pages on said tracks, and a multitude of segment control blocks, and wherein the means for deconfiguring includes
  means for identifying selected pages to be removed from the first cache, all of said selected pages being on the same one of said tracks, and
  means for storing in one of the segment control blocks an ID of said one of said tracks.

5. A storage controller according to claim 4, wherein:
  the means for deconfiguring further includes:
    means for marking each of said selected pages as unavailable, and
    means for removing the selected pages from the first cache after all of said selected pages are marked as unavailable.

6. A storage controller according to claim 5, wherein the means for marking includes
  means for determining for each of the selected pages, whether the page is modified or unmodified;
  means for marking the page as unavailable if the page is unmodified; and
  means for processing the page according to a defined routine if the page is modified, and then marking the page as unavailable.

7. A system for deconfiguring a memory cache, said memory cache including a series of tracks, a series of memory pages on said tracks, and a multitude of segment control blocks, the controller comprising:
  means for identifying selected pages of the cache, all of said selected pages being on the same one of said tracks;
  means for marking each of said selected pages as unavailable; and
  means for removing the selected pages from the cache after all of said selected pages are marked as unavailable, including means for storing in one of the segment control blocks an ID of said one of said tracks.

8. A program storage device readable by machine, tangibly embodying a program of instructions executable by the machine to perform method steps for operating a storage controller for interfacing between a plurality of host systems and a direct access storage devices system, the storage controller including a first cluster including a first processor and a first cache, and a second cluster including a second processor and a second cache, said method steps comprising:
  directing data from the host systems through first and second data paths in the storage controller to the direct access storage system, wherein the first processor and the first cache are associated with the first data path, and the second processor and the second cache are associated with the second data path;
  under a first set of defined conditions, entering into a failover mode, wherein data directed to the first data path are routed to the second data path; and
  under a second set of defined conditions, deconfiguring the first cache without entering the failover mode; and
  wherein the first cache includes a series of tracks, a series of memory pages on said tracks, and a multitude of segment control blocks, and wherein the deconfiguring includes:
  identifying selected pages to be removed from the first cache, all of said selected pages being on the same one of said tracks; and
  storing in one of the segment control blocks an ID of said one of said tracks.

9. A program storage device according to claim 8, wherein the deconfiguring step includes the further steps of:
  marking each of said selected pages as unavailable; and
  after all of said selected pages are marked as unavailable, removing the selected pages from the first cache.

10. A program storage device according to claim 9, wherein the step of marking each of the pages as unavailable includes the steps of, for each of the selected pages,
  determining whether the page is modified or unmodified;
  if the page is unmodified, marking the page as unavailable; and
  if the page is modified, processing the page according to a defined routine, and then marking the page as unavailable.

* * * * *